US005892806A

United States Patent [19]
Scott

[11] Patent Number: 5,892,806
[45] Date of Patent: Apr. 6, 1999

[54] PRESSURE TUBE SPACER

[75] Inventor: David A. Scott, Mississauga, Canada

[73] Assignee: Atomic Energy of Canada Limited/Energie Atomique du Canada Limiteé, Ottawa, Canada

[21] Appl. No.: 876,704

[22] Filed: Jun. 16, 1997

[51] Int. Cl.[6] .................................................. G21C 15/00
[52] U.S. Cl. .......................... 376/362; 376/286; 376/292; 376/366; 285/123.1; 138/113; 24/20 R
[58] Field of Search ..................................... 376/285, 286, 376/291, 292, 362, 366, 401, 436; 285/123.1, 123.15; 138/108, 112, 113, 114, 148; 24/20 R, 271, 274 WB; 248/49, 345.1; 403/371

[56] References Cited

U.S. PATENT DOCUMENTS

| | | | |
|---|---|---|---|
| 3,022,085 | 2/1962 | Kennedy, Jr. ............................ | 376/362 |
| 3,106,520 | 10/1963 | Wolfe et al. ............................. | 376/401 |
| 3,213,889 | 10/1965 | Cotman, Jr. ............................. | 138/113 |
| 3,593,390 | 7/1971 | Pettigrew ................................ | 376/366 |
| 3,867,055 | 2/1975 | Wooden .................................. | 403/373 |
| 4,033,381 | 7/1977 | Newman et al. ....................... | 138/113 |
| 4,531,552 | 7/1985 | Kim ........................................ | 138/114 |

*Primary Examiner*—Daniel D. Wasil
*Attorney, Agent, or Firm*—Morgan, Lewis & Bockius LLP

[57] ABSTRACT

A spacer for maintaining a pressure tube in spaced relation with a calandria tube of a nuclear reactor. The spacer comprising a split ring adapted to be disposed about the outer surface of said pressure tube. The ring has a central annular body portion with a raised bearing surface thereon adapted to contact the inner surface of said calandria tube and prevent contact between said outer surface and said inner surface. An annular land projecting from each side of said central body portion is adapted to receive a collar thereon effective create an interference fit between said ring and said pressure tube and thereby constrain axial movement of said spacer on said pressure tube. The spacer of the present invention maintains its location on the pressure tube and does not suffer the axial movement which characterizes some conventional spacers. The bearing surface can have a coating to reduce wear and heat transfer.

16 Claims, 2 Drawing Sheets

PRESSURE TUBE SPACER

FIELD OF THE INVENTION

This invention relates to a spacer for maintaining an inner tube in spaced relation within an outer tube and in particular to a spacer for maintaining a distance between a pressure tube and a calandria tube in a nuclear reactor. The invention is particularly concerned with a spacer which is fixed to the outer surface of the pressure tube.

BACKGROUND OF THE INVENTION

In a nuclear reactor, the pressure tubes which contain the fuel bundles are each positioned within a calandria tube. It is necessary to have an annular space maintained between the pressure tube and the calandria tube to allow for the circulation of gases which thermally insulate the hot pressure tube from the relatively colder calandria tube and the heavy water moderator which flows in the space outside the calandria tube.

Conventionally, a garter spring spacer has been used to maintain the space between the pressure tube and the calandria tube. A garter spring spacer is an endless helical spring disposed around the pressure tube. Its convolutions contact the walls of both the pressure tube and the calandria tube. The spring is unattached to either tube. A garter spring spacer was disclosed in U.S. Pat. No. 3,106,520 issued to Wolfe et al. Oct. 8, 1963.

While the garter spring is effective to support the pressure tube within the calandria tube, there are a number of drawbacks inherent in its use. Because garter spring spacers are not attached to either the pressure tube or the calandria tube, they must be installed on the pressure tube after the pressure tube has been placed inside the calandria tube. As a result, installation of the garter spring spacers is a difficult procedure which requires tedious operations to be carried out at the reactor face. The problem is exacerbated over the operating time of the fuel channel as increased sag develops in the calandria tubes.

The difficulty installing the spacers is of particular significance to the fuel channel replacement procedures because each time the fuel channels are replaced, the spacers must be re-installed. Consequently, the procedure is slow and expensive. An improved fuel channel replacement procedure is desirable not only to reduce the time and expense of the operation but also to reduce the radiation dose level to which those who replace the fuel channels may be exposed.

Another problem with garter spring spacers is that they have a tendency to move axially along the pressure tube during operation of the reactor. This movement is due to vibration and thermal cycling. When axial movement occurs, the spacers must be repositioned. Repositioning the spacers is difficult and costly and may also result in radiation exposure to those who conduct the procedure.

Furthermore, the geometry of the garter spring spacer has limited the materials which can be used in its manufacture. Garter spring spacers have conventionally contained Inconel. It would be desirable to use only zirconium alloy to reduce fuel burn-up and increase neutron efficiency, however the brittleness of that material renders it difficult to form into a spring. Further, there would be considerable concern that a garter spring formed only of zirconium alloy would break during the life cycle of the reactor.

Garter spring spacers are also known to cause wear on the inner wall of the calandria tube which may reduce the burst strength of the tube.

Thus there is a need for a pressure tube spacer which is effective to maintain a space between the pressure tube and the calandria tube and which overcomes some of the difficulties inherent in the use of prior art spacers such as the garter spring spacer.

SUMMARY OF THE INVENTION

In accordance with the present invention there is provided a spacer for maintaining an inner tube in spaced relation within an outer tube, said spacer comprising a split ring adapted to be disposed about the outer surface of said inner tube, said ring having a central annular body portion with a raised bearing surface thereon adapted to contact the inner surface of said outer tube and prevent contact between said outer surface and said inner surface, an annular land projecting from each side of said central body portion, and a transverse split across said central annular body portion and said lands, each of said lands adapted to receive a collar thereon effective to close said split and create an interference fit between said ring and said inner tube and thereby constrain axial movement of said spacer on said inner tube.

In accordance with another aspect of the present invention there is provided a spacer for maintaining a pressure tube in spaced relation with a calandria tube of a nuclear reactor, said spacer comprising a split ring adapted to be disposed about the outer surface of said pressure tube, said ring having a central annular body portion with a raised bearing surface thereon adapted to contact the inner surface of said calandria tube and prevent contact between said outer surface and said inner surface, an annular land projecting from each side of said central body portion, and a transverse split across said central annular body portion and said lands, each said land adapted to receive a collar thereon effective to close said split and create an interference fit between said ring and said pressure tube and thereby constrain axial movement of said spacer on said pressure tube.

In accordance with other aspects of the invention, the lands can each have a groove or ridge to retain said collar thereon. In accordance with other aspects of the invention, a concavity can be provided in the central annular body portion forming an annular void space between said raised bearing surface and said pressure tube. In accordance with other aspects of the invention, the said bearing surface can have a coating to reduce heat transfer or friction between said ring and said outer tube.

The present invention provides a spacer which is fixed to the outer wall of the pressure tube to prevent axial movement of the spacer on the pressure tube. By limiting this axial movement, the invention overcomes many of the problems of the prior art spacers. The spacer can be installed on the pressure tube before the pressure tube is installed in the calandria thus improving the installation and fuel channel replacement procedures. Further, repositioning of the spacer under normal circumstances no longer necessary.

DETAILED DESCRIPTION OF THE INVENTION

Figure 1:
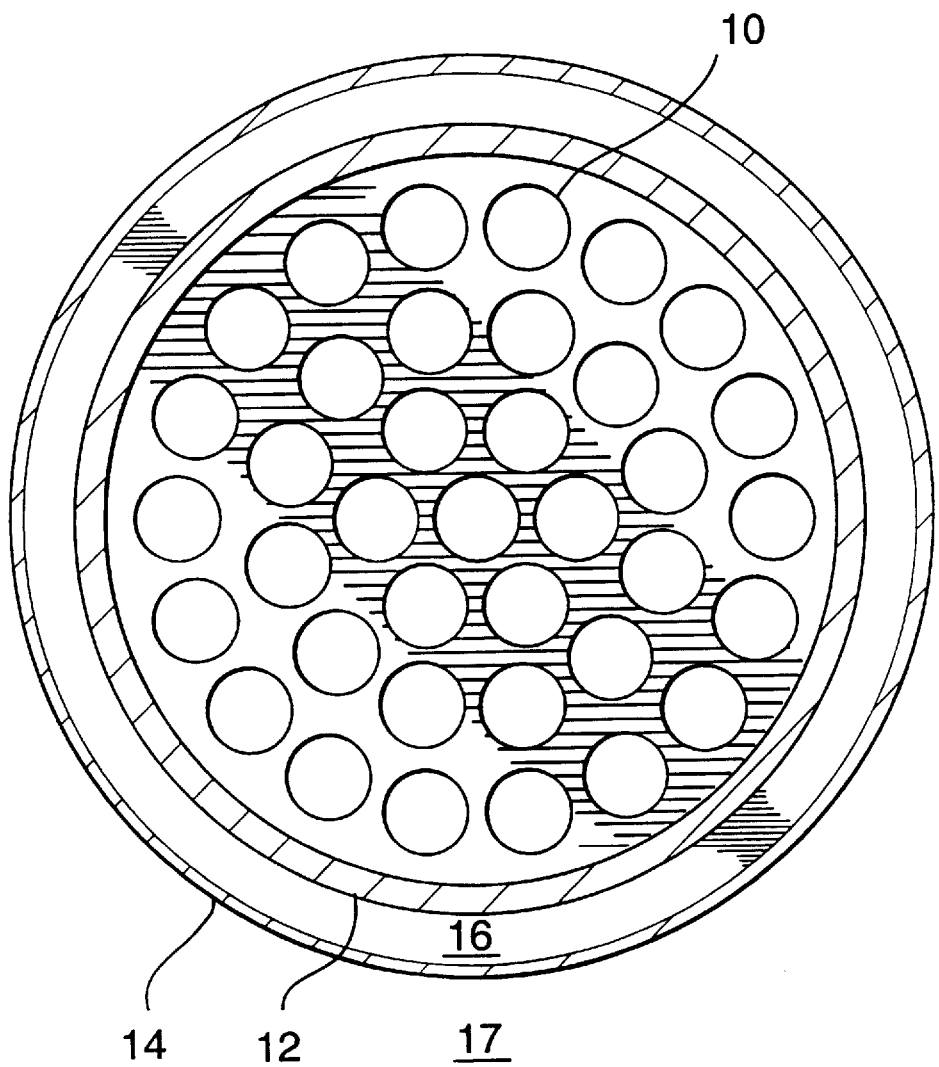
FIG. 1 is a schematic representation of a fuel channel arrangement in cross-sectional view.

The fuel channel arrangement commonly used in a CANDU reactor is shown in FIG. 1. Fuel bundles 10 are arranged end-to-end in pressure tube 12 which in turn is encased by calandria tube 14. Gas, typically carbon dioxide, circulates within annular space 16 between pressure tube 12 and calandria tube 14 to thermally insulate pressure tube 12 from calandria tube 14 and the heavy water moderator which flows in the space 17 outside calandria tube 14. Heavy water coolant is contained within pressure tube 14.

Pressure tube 12 and calandria tube 14 are fixed in coaxial relation at either end to the calandria end shield tube sheets and are unsupported therebetween. As the reactor ages, pressure tube 12 is subject to sag. The spacer of the present invention is applied to the outer surface of pressure tube 12 to prevent contact of the outer surface of pressure tube 12 with the inner surface of calandria tube 14.

Figure 2:
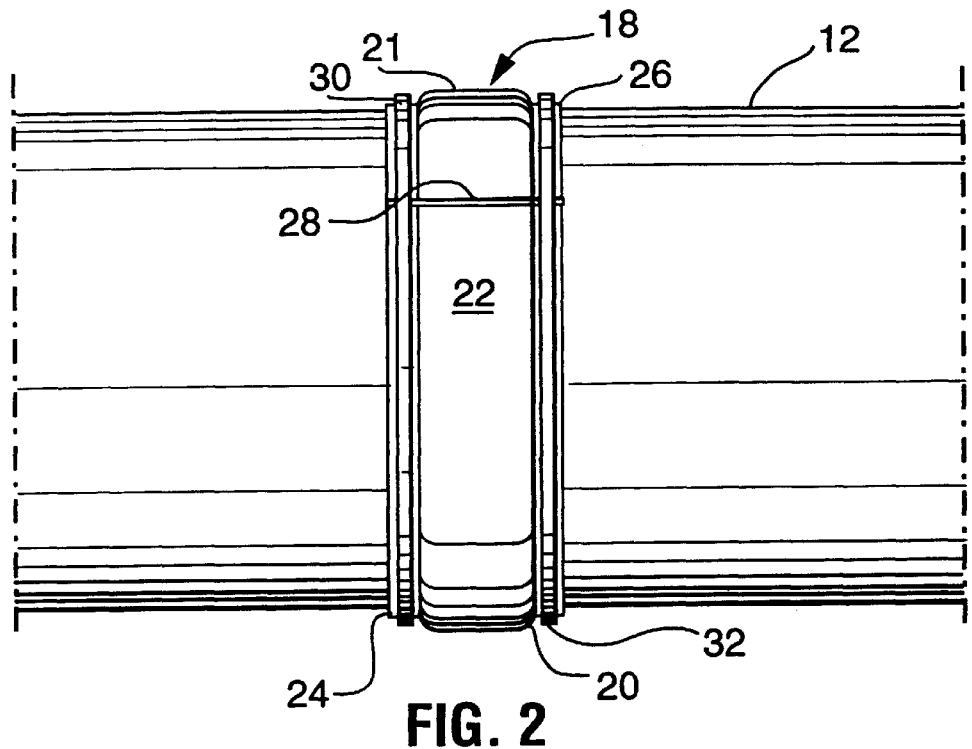
FIG. 2 is a side elevational view of a pressure tube fitted with the spacer of the present invention.
Figure 3:
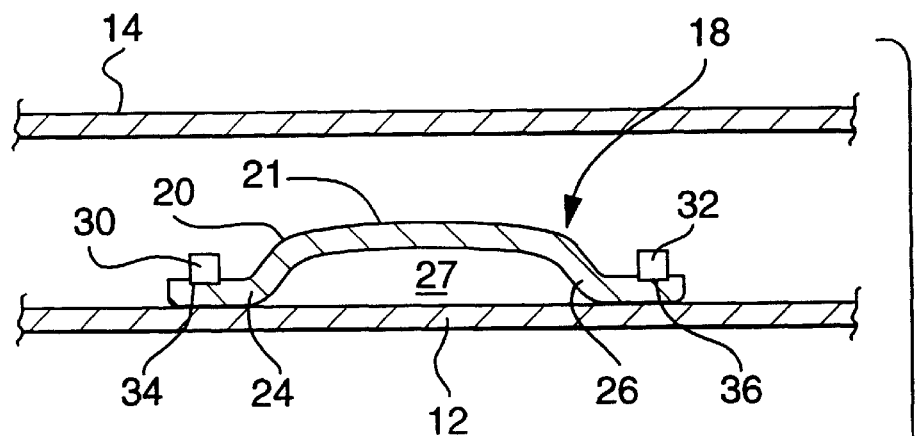
FIG. 3 is a longitudinal cross-sectional plan view of the pressure tube and spacer shown in FIG. 2.
Figure 3:
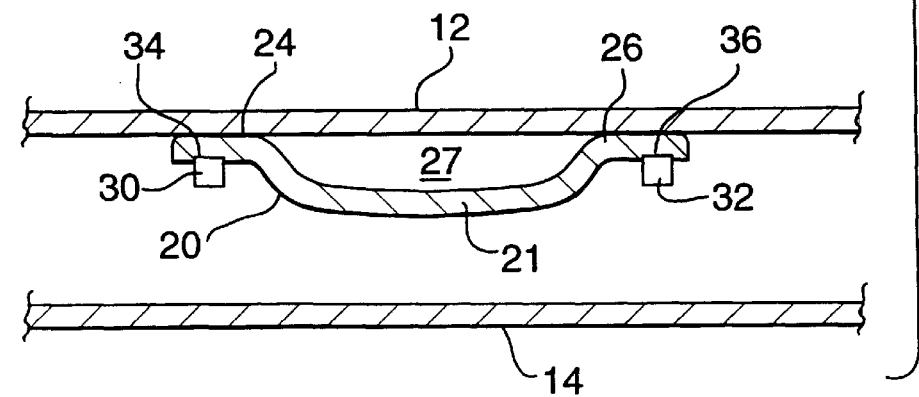

The spacer of the present invention is shown in FIG. 2 and FIG. 3. The spacer, generally designated by reference numeral 18, has an annular ring 20 of generally circular cross-section which has a central annular body portion 21 and a land 24, 26 projecting at either side of central body portion 21 in contact with pressure tube 12. Central body portion 21 has a raised bearing surface 22. Annular ring 20 is a split ring with split 28 through central body portion 21 and lands 24, 26. The inside diameter of lands 24, 26 is approximately equal to the outer diameter of pressure tube 12.

Annular ring 20 can be advantageously formed with a concavity 27 under central body portion 21. When assembled to pressure tube 12, concavity 27 forms a void space which reduces heat transfer between pressure tube 12 and calandria tube 14.

Annular collars 30, 32 are disposed on lands 24, 26 and are sized to be forced onto lands 24, 26 and thereby narrow split 28 to create an interference fit between spacer 18 and pressure tube 12. In this manner, collars 30, 32 are effective to constrain spacer 18 against axial movement on pressure tube 12.

In practice, a plurality of spacers 18 are installed at regularly spaced intervals along each pressure tube 12. To account for diametrical variation of pressure tube 12, collars 30, 32 are selected from a sets of collars having small variances in diameters in order to achieve the required interference fit at the positions to be installed.

Annular collars 30, 32 can be retained on lands 24, 26 by any suitable means. If desired, lands 24, 26 can be formed with shallow grooves into which collars 30, 32 can be forced, or optionally can have raised ridges over which collars 30, 32 can be forced. As shown in FIG. 3, lands 24, 26 have grooves 34, 36 formed thereon.

While pressure tube 12 is shown in FIG. 3 as being concentrically spaced within calandria tube 14, it will be understood that as pressure tube 12 sags, spacer 18 becomes offset in relation to its position within calandria tube 14, and eventually, raised bearing surface 22 will abut inner surface of calandria tube 14 thereby preventing contact between pressure tube 12 and calandria tube 14 and maintaining tubes 12, 14 in spaced relation. The extent to which bearing surface 22 is raised above lands 24, 26 depends upon the relative diameters of pressure tube 12 and calandria tube 14. Sufficient space must be maintained between spacer 18 and calandria tube 14 to allow for the circulation of gases in annular space 16 taking into account the diametrical creep of pressure tube 12 which occurs over its operating time.

As the pressure tube ages, it undergoes a slight increase in diameter, known to those skilled in the art as diametrical creep. Conventional garter springs are sized to loosely fit about the pressure tube in order to accommodate diametrical variations and creep of the pressure tube. This has the significant disadvantage that conventional garter springs can be displaced from their initial position over the life of the reactor with the result that the distance between adjacent garter springs can exceed that required to maintain the pressure tube out of contact with the calandria tube. In such circumstances, time consuming and costly procedures are required to reposition the garter springs. In the present invention split 28 accommodates diametrical variations of the pressure tube and may allow for the diametrical expansion of annular ring 20.

Collars 30, 32 are preferably formed of the same material used to manufacture pressure tubes 12. In the alternative, collars 30, 32 may be formed of a different material than pressure tubes 12 provided the creep coefficient of the materials is substantially the same. This matching of creep coefficients is advantageous because collars 30, 32 will not come loose (as they would if they had a higher creep rate than the pressure tube) nor will they restrict the expansion of the pressure tube (as they would if they had a lower creep rate than the pressure tube).

For pressure tubes made of zirconium alloy, collars 30, 32 are preferably formed of the same zirconium alloy. However other suitable materials can also be used. Annular ring 20 is preferably also manufactured from zirconium alloy. However, because of split 28, it is not necessary to ensure that the annular ring 20 be formed from the same material, or one having the same coefficient of diametrical creep as the pressure tube.

One of the advantages of the present invention is that because spacer 18 maintains its position on pressure tube 12, spacer 18 can be applied to pressure tube 12 before pressure tube 12 is inserted in calandria tube 14 and spacer 18 is not displaced during insertion. As a result, the difficult and tedious procedure of installing spacers at the reactor face is avoided. The use of the spacers of the present invention consequently results in a significant reduction in installation time and a corresponding reduction in radiation exposure to those persons conducting the installation procedure. Similarly, the ability to apply spacer 18 to pressure tube 12 before pressure tube 12 is installed in the reactor improves the safety and efficiency of the fuel channel replacement procedures.

During operation, the spacer of the present invention also maintains its location on the pressure tube and does not suffer the axial movement which characterize some of the prior art spacers. Accordingly, under normal circumstances, there is no need to reposition the spacers.

The geometry of the spacer of the present invention provides a number of advantages. It allows for the spacer to be constructed of zirconium alloy. The use of zirconium alloy is beneficial because of the reduced fuel burn-up and increased neutron efficiency inherent in that materials as compared with Inconel used in the manufacture of conventional garter spring spacers.

The geometry also provides bearing surface 22 which advantageously can have a zirconium oxide coating applied thereto. The coating can be applied by the plasma spray technique or any other suitable technique well known to those skilled in the art. The oxide coating has a number of beneficial functions. Firstly, it minimizes wear on the inner wall of calandria tube 14 where that tube contacts bearing surface 22. This minimal wear maintains the burst strength of the tube which is necessary for safe operation of the reactor and which is necessary to meet regulatory requirements. Secondly, it permits relative movement between bearing surface 22 and calandria 14 which is necessary due to the differential thermal expansion between pressure tube 12 and calandria tube 14 and to allow for the differential creep between these two components. Thirdly, it provides low heat transfer between pressure tube 12 and calandria tube 14. Other suitable coatings which provide the above functions can also be used.

In addition, concavity 27 provides a thermal barrier between pressure tube 12 and calandria tube 14 and prevents cold spots on pressure tube 12 which may result in undesirable blister formation. Its presence also reduces the amount of material required to form annular ring 20.

Although the present invention has beendescribed with particular reference to its use to maintain pressure tubes in spaced relation within calandria tubes of a nuclear reactor, the invention has more general application to maintain concentrically disposed tubes in spaced relation.

We claim:

1. A spacer for maintaining an inner tube in spaced relation within an outer tube in a nuclear reactor, said spacer comprising:

a split ring adapted to be disposed about the outer surface of said inner tube, said ring having a central annular body portion with a raised annular bearing surface thereon adapted to contact the inner surface of said outer tube and prevent contact between said outer surface and said inner surface, an annular land projecting from each side of said central body portion, and a transverse split across said central annular body portion and said lands ;and a collar adapted to be received on one of said lands and effective to create an interference fit between said ring and said inner tube and thereby constrain axial movement of said spacer on said inner tube.

2. The spacer of claim 1 wherein each said land has a groove or ridge to retain said collar thereon.

3. The spacer of claim 1 wherein said split ring has a concavity formed in the central annular body portion, said concavity forming an annular void space between said raised bearing surface and said inner tube.

4. The spacer of claim 1 wherein said bearing surface has a coating to reduce heat transfer between said ring and said outer tube.

5. The spacer of claim 1 wherein said bearing surface has a coating to reduce wear between said ring and said outer tube.

6. A spacer for maintaining a pressure tube in spaced relation with a calandria tube of a nuclear reactor, said spacer comprising:

a split ring adapted to be disposed about the outer surface of said pressure tube, said ring having a central annular body portion with a raised annular bearing surface thereon adapted to contact the inner surface of said calandria tube and prevent contact between said outer surface and said inner surface, an annular land projecting from each side of said central body portion, and a transverse split across said central annular body portion and said lands; and a collar adapted to be received on one of said lands and effective to create an interference fit between said ring and said pressure tube and thereby constrain axial movement of said spacer on said pressure tube.

7. The spacer of claim 6 wherein each of said lands has a groove or ridge to retain said collar thereon.

8. The spacer of claim 6 wherein said split ring has a concavity formed in the central annular body portion, said concavity forming an annular void space between said raised bearing surface and said pressure tube.

9. The spacer of claim 6, 7 or 8 wherein said collar is formed of material having substantially the same coefficient of diametrical creep as said pressure tube.

10. The spacer of claim 6, 7 or 8 wherein said collar is formed of the same material as said pressure tube.

11. The spacer of claim 10 wherein said collar is formed of zirconium alloy.

12. The spacer of claim 6, 7 or 8 wherein said collar and said split ring are formed of the same material as said pressure tube.

13. The spacer of claim 12 wherein said collar and said split ring are formed of zirconium alloy.

14. The spacer of claim 6, 7 or 8 where said bearing surface has a coating to reduce heat transfer between said ring and said calandria tube.

15. The spacer of claim 6, 7 or 8 where said bearing surface has a coating to reduce wear between said ring and said calandria tube.

16. The spacer of claim 14 wherein said coating is zirconium oxide.

* * * * *